United States Patent [19]
Arimilli et al.

[11] Patent Number: 5,895,484
[45] Date of Patent: Apr. 20, 1999

[54] METHOD AND SYSTEM FOR SPECULATIVELY ACCESSING CACHE MEMORY DATA WITHIN A MULTIPROCESSOR DATA-PROCESSING SYSTEM USING A CACHE CONTROLLER

[75] Inventors: Ravi Kumar Arimilli, Austin; John Steven Dodson, Pflugerville; Jerry Don Lewis, Round Rock, all of Tex.

[73] Assignee: International Business Machines Corporation, Armonk, N.Y.

[21] Appl. No.: 08/839,541

[22] Filed: Apr. 14, 1997

[51] Int. Cl.⁶ .............................................. G06F 13/00
[52] U.S. Cl. ............................................ 711/118; 711/147
[58] Field of Search ........................... 395/860; 711/145, 711/146, 118, 147

[56] References Cited

U.S. PATENT DOCUMENTS

| | | | |
|---|---|---|---|
| 4,296,466 | 10/1981 | Guyer et al. | 364/200 |
| 4,561,051 | 12/1985 | Rodman et al. | 364/200 |
| 5,191,649 | 3/1993 | Cadambi et al. | 395/200 |
| 5,261,109 | 11/1993 | Cadambi et al. | 395/725 |
| 5,271,020 | 12/1993 | Marisetty | 371/30 |
| 5,282,272 | 1/1994 | Guy et al. | 395/275 |
| 5,506,971 | 4/1996 | Gullette et al. | 395/296 |
| 5,553,310 | 9/1996 | Taylor et al. | 395/860 |
| 5,572,702 | 11/1996 | Sarangdhar et al. | 395/473 |
| 5,659,708 | 8/1997 | Arimilli et al. | 711/146 |
| 5,751,996 | 5/1998 | Glew et al. | 711/145 |

*Primary Examiner*—Tod R. Swann
*Assistant Examiner*—David Langjahr
*Attorney, Agent, or Firm*—Richard A. Henkler; Antony P. Ng; Andrew J. Dillon

[57] ABSTRACT

A method and system for speculatively sourcing cache memory data within a multiprocessor data-processing system is disclosed. In accordance with the method and system of the present invention, the data-processing system has multiple processing units, each of the processing units including at least one cache memory. In response to a request for data by a first processing unit within the data-processing system, an intervention response is issued from a second processing unit within the data-processing system that contains the requested data. The requested data is then read from a cache memory within the second processing unit before a combined response from all the processing units returns to the second processing unit.

16 Claims, 3 Drawing Sheets

METHOD AND SYSTEM FOR SPECULATIVELY ACCESSING CACHE MEMORY DATA WITHIN A MULTIPROCESSOR DATA-PROCESSING SYSTEM USING A CACHE CONTROLLER

BACKGROUND OF THE INVENTION

1. Technical Field

The present invention relates to a method and system for sharing data among cache memories in general and, in particular, to a method and system for sharing data among cache memories within a multiprocessor data-processing system. Still more particularly, the present invention relates to a method and system for speculatively sourcing data among cache memories within a multiprocessor data-processing system.

2. Description of the Prior Art

In a symmetric multiprocessor (SMP) data-processing system, all of the processing units are generally identical; that is, they all utilize a common set or subset of instructions and protocols to operate and, generally, have the same architecture. Each processing unit includes a processor core having multiple registers and execution units for carrying out program instructions. Each processing unit also may have one or more primary caches (i.e., level one or L1 caches), such as an instruction cache and/or a data cache, which are implemented utilizing high-speed memories. In addition, each processing unit also may include additional caches, typically referred to as a secondary cache (i.e., level two or L2 cache) for supporting the primary caches such as those mentioned above.

Under an SMP environment, the transfer of data from one processing unit to another processing unit on a system bus without going through a system memory is referred to as an intervention. An intervention protocol improves system performance by reducing the number of cases in which the system memory must be accessed in order to satisfy a read or read-with-intent-to-modify (RWITM) request by any one of the processing units within the system.

Broadly speaking, when there is an outstanding read/RWITM request by a processing unit, any one of the other processing units, attached to the system bus, that possesses the requested data within its cache(s) can source the data to the requesting processing unit. Under the traditional is intervention protocol, the processing unit having the data residing in its cache will wait for a "combined" response from all processing units within the system before issuing a data bus request to source the data from its cache(s).

At the same time, SMP buses also have a "retry" mechanism, and any read/RWITM request that could be satisfied by an intervention could also be interrupted by a "retry" from any one of the processing units on the system bus. If one processing unit responds with an intervention while another processing unit responds with a "retry," under a well-established rule, the retry response automatically overrules the intervention response. As a result, if there is an outstanding retry request by any one of the processing units on the system bus, the processing unit that contains the data will not issue a data bus request.

Consequently, it would be desirable to provide an improved sourcing scheme in which intervention data will be sourced in such a way that is less influenced by the "retries" from any of the processing units within the multiprocessor data-processing system.

SUMMARY OF THE INVENTION

In view of the foregoing, it is therefore an object of the present invention to provide an improved method and system for sharing data among cache memories.

It is another object of the present invention to provide an improved method and system for sharing data among cache memories within a multiprocessor data-processing system.

It is yet another object of the present invention to provide an improved method and system for speculatively sourcing data among cache memories within a multiprocessor data-processing system.

In accordance with the method and system of the present invention, a data-processing system has multiple processing units, each of the processing units including at least one cache memory. In response to a request for data by a first processing unit within the data-processing system, an intervention response is issued from a second processing unit within the data-processing system that contains the requested data. The requested data is then read from a cache memory within the second processing unit before a combined response from all the processing units returns to the second processing unit.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

The present invention may be implemented in any multiprocessor data-processing system, each processor having at least one cache memory. Also, it is understood that the features of the present invention may be applicable in various multiprocessor data-processing systems, each processor having a primary cache and a secondary cache.

Figure 1:
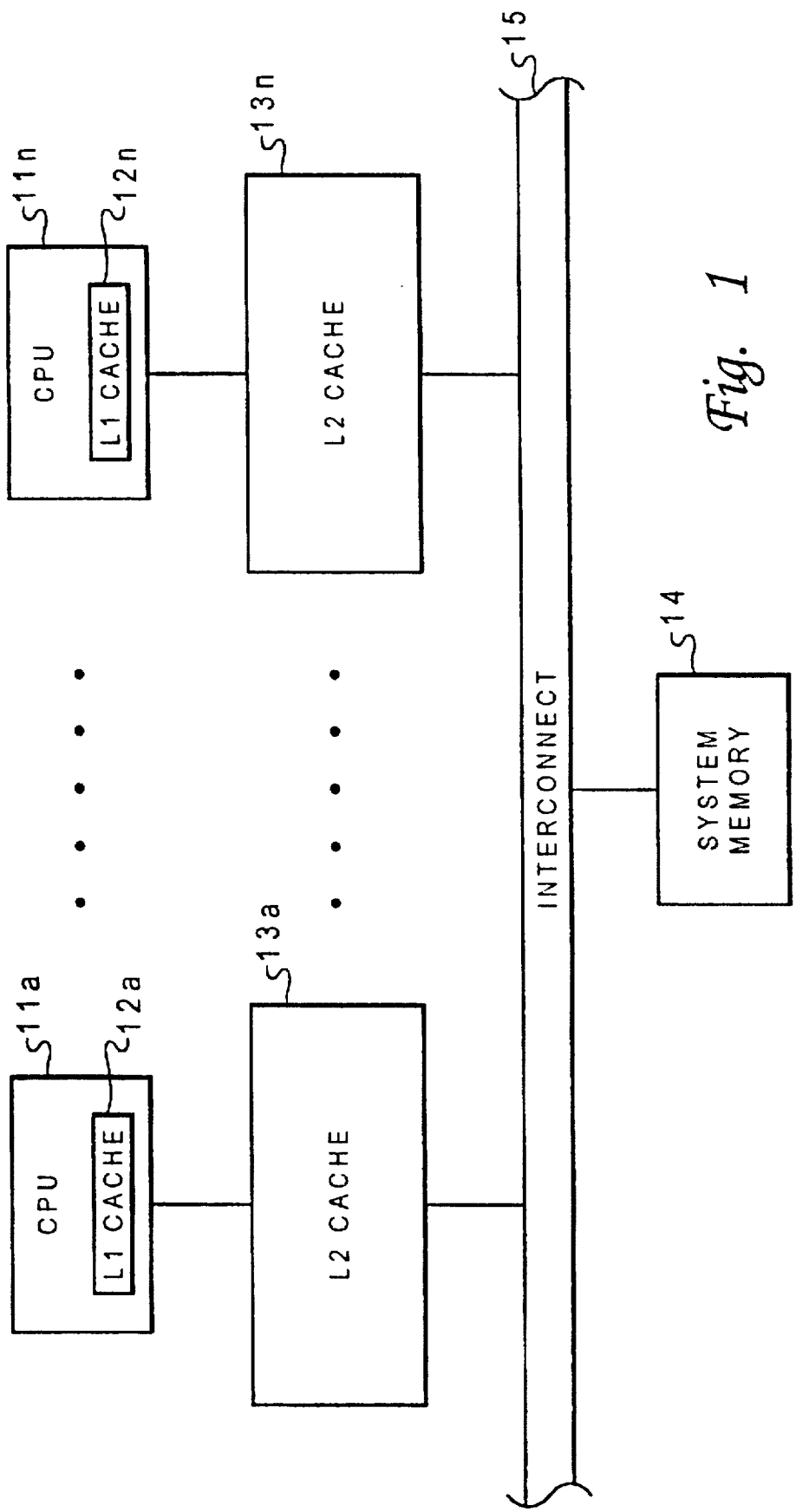
FIG. 1 is a block diagram of a data-processing system in which the present invention may be applicable.

Referring now to the drawings and, in particular, to FIG. 1, there is depicted a block diagram of a data-processing system 10 in which the present invention may be applicable. Data-processing system 10 includes multiple central processor units (CPUs) 11a–11n, and each of CPUs 11a–11n contains a primary cache. As shown, CPU 11a contains a primary cache 12a, while CPU 11n contains a primary cache 12n. Each of primary caches 12a–12n may be a sectored cache.

Each of CPUs 11a–11n is coupled to each of secondary caches 13a–13n, respectively. Each of secondary caches 13a–13n also may be a sectored cache. CPUs 11a–11n, primary caches 12a–12n, and secondary caches 13a–13n are connected to each other via an interconnect 15 to a system memory 14. Interconnect 15 can be either a bus or a switch.

As a preferred embodiment of the present invention, a CPU, a primary cache, and a secondary cache, such as CPU 11a, primary cache 12a, and secondary cache 13a as depicted in FIG. 1, may be collectively known as a processing unit. Although a preferred embodiment of a data-processing system is described in FIG. 1, it should be understood that the present invention can be practiced within a variety of system configurations. For example, each of CPUs 11a–11n may have more than two levels of cache memory.

With reference now to Table I, there is illustrated a number of established coherency responses from a processing unit under the prior-art intervention protocol. After a processing unit within the multiprocessor data-processing system makes a read or read-with-intent-to-modify (RWITM) request on a system bus, all other processing units within the system may issue one of the responses in accordance with Table I, after snooping.

TABLE I

| Coherency Response | Priority | Definition |
|---|---|---|
| 000 | — | Reserved |
| 001 | 3 | Shared Intervention |
| 010 | — | Reserved |
| 011 | — | Reserved |
| 100 | 1 | Retry |
| 101 | 2 | Modified Intervention |
| 110 | 4 | Shared |
| 111 | 5 | Null or Clean |

As depicted in Table I, the coherency responses take the form of a 3-bit snoop response signal, with the definition of each coherency response set forth. These signals are encoded to indicate the snoop result after the address tenure. In addition, a priority value is associated with each response to allow a system logic to determine which of the coherency responses should take priority when formulating a single snoop response signal to be returned to all processing units on the system bus. For example, if a processing unit responds with a shared intervention response (priority 3), and another processing unit responds with a retry response (priority 1), then the processing unit with the retry response will take priority such that the system logic will return a retry coherency response to the requesting processing unit as well as to all other processing units that are attached on the system bus. This system logic may reside in various components within the system, such as a system control unit or a memory controller.

Several well-known mechanisms may be employed to ascertain which cache (of a processing unit) is the "owner" of the data that is being requested, and therefore entitled to source the data. Under the prior-art MESI protocol, if a cache holds the requested data in a "Modified" or an "Exclusive" state, that means this cache is the only one within the system which contains a valid copy of the data and is clearly the owner. If, however, a cache holds the requested data in a "Shared" state, that means the data must also be held in at least one other cache within the system. Thus, potentially, either one of the two or more caches can source the data. In such a case, several alternatives are available to determine which cache should perform sourcing.

Figure 2:
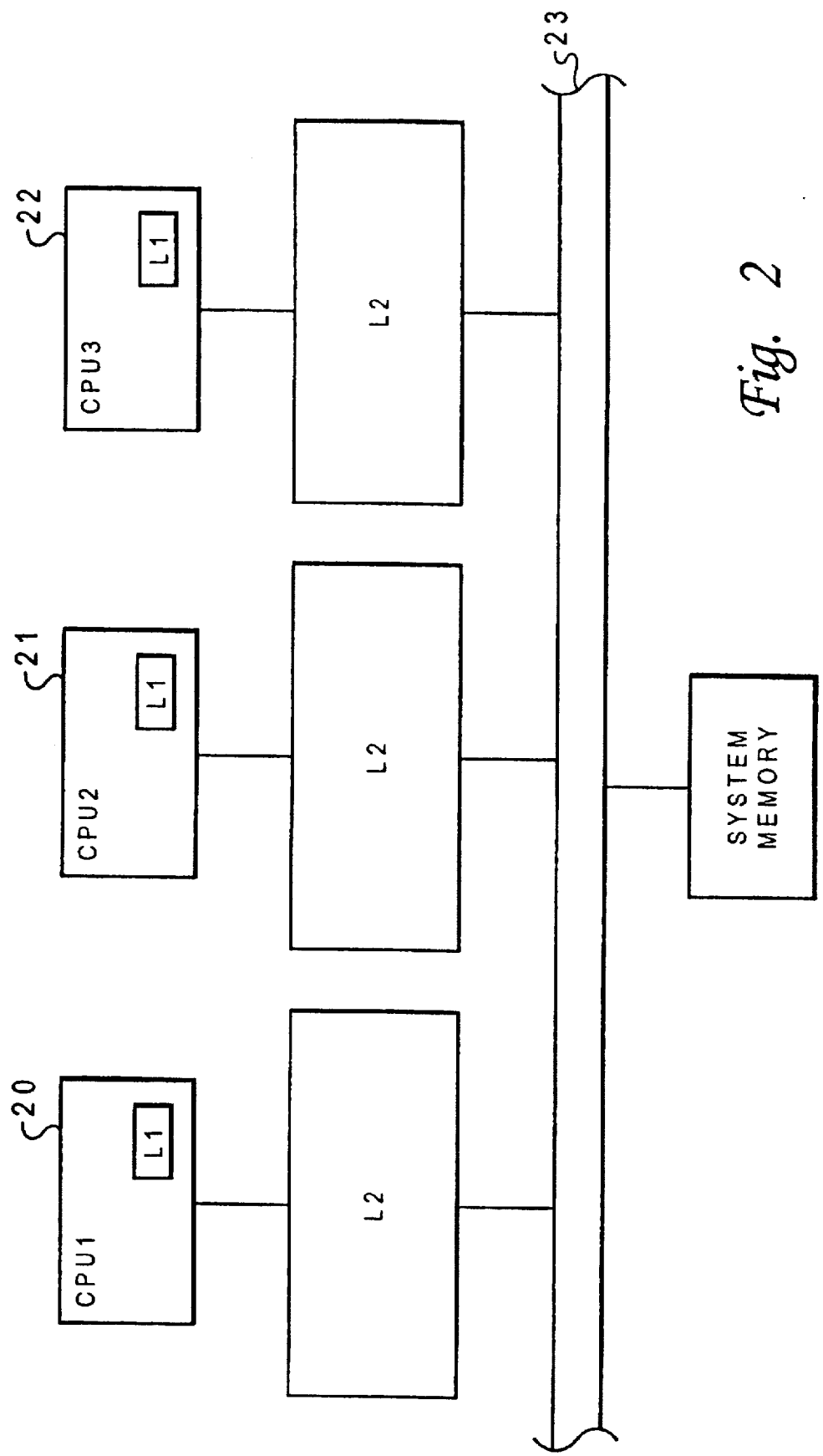
FIG. 2 is a block diagram of a three-processor data-processing system for illustrating a sourcing scheme under the prior art.

Referring now to FIG. 2, there is depicted a block diagram of a three-processor data-processing system for illustrating a sourcing scheme under the prior art. As shown, for example, processing unit 20 desires to make a read or RWITM request on a system bus 23, and L2 cache of processing unit 21 contains the data being requested by processing unit 20. Furthermore, the L2 cache within processing unit 20 is in an "Invalid" state, the L2 cache within processing unit 21 is in a "Modified" state, and the L2 cache within processing unit 22 is in an "Invalid" state. The subsequent sequence of actions will be taken by a respective L2 cache controller of each processing unit for performing the source intervention as dedicated by the prior art.

After processing unit 20 makes its read/RWITM request, the read/RWITM request is "snooped" from system bus 23 by processing unit 21 and processing unit 22. An L2 cache directory lookup is performed in each of the processing units 21, 22 to determine whether or not the requested data is resident in its L2 cache. Because processing unit 21 has the requested data, an intervention response will be issued by processing unit 21, and a finite state machine within processing unit 21 will be dispatched to control the following actions. If the data within the L2 cache of processing unit 21 is in a "Modified" state, a modified intervention coherency response will be issued by processing unit 21. Otherwise, if the data within the L2 cache of processing unit 21 is in a "Shared" or "Exclusive" state, a shared intervention coherency response will be issued by processing unit 21. Because the L2 cache within processing unit 22 is in an "Invalid" state (or if it does not contain the requested data), a null coherency response will be issued by processing unit 22.

After the issuance of the intervention response, processing unit 21 is pending for a combined response which basically includes, in this example, the coherency response from itself and from processing unit 22. If the returned combined response is a modified intervention coherency response, processing unit 21 may start sourcing the requested data from its L2 cache. If processing unit 22 requests a retry for whatever reason, the sourcing must yield to the retry request (i.e., the sourcing sequence will not proceed), under the established intervention protocol. For example, processing unit 22 may be in a snoop queue busy condition.

If the data in the L2 cache of processing unit 21 has not been modified or is not resident in the L1 cache (i.e., not L1 inclusive) since the snoop action has been initiated, processing unit 21 may begin to make a system bus request to the system bus arbiter (typically, the requested data must be read into a buffer by the L2 cache controller before the system bus request can begin). Otherwise, the L1 cache of processing unit 21 will be flushed and invalidated (i.e., forcing the L1 cache to "push" any modified data back to the L2 cache and invalidating the copy in the L1 cache) before any system bus request can be made. If the L1 cache of processing unit 21 is in a "Shared" state, however, only an invalidation to the L1 cache is required before making any data bus request.

Processing unit 21 then waits for a system bus grant to return. The actual data-sourcing will begin after the data bus grant is received. Once the sourcing has completed, the L2 cache of processing unit 20 will be changed from an "Invalid" state to a "Shared" state for a read request and to a "Modified" state for an RWITM request. Contrarily, the L2 cache of processing unit 21 will be changed from a "Modified" state to a "Shared" state for a read request and to an "Invalid" state for an RWITM request. There is no change of state in the L2 cache of processing unit 22.

Figure 3:
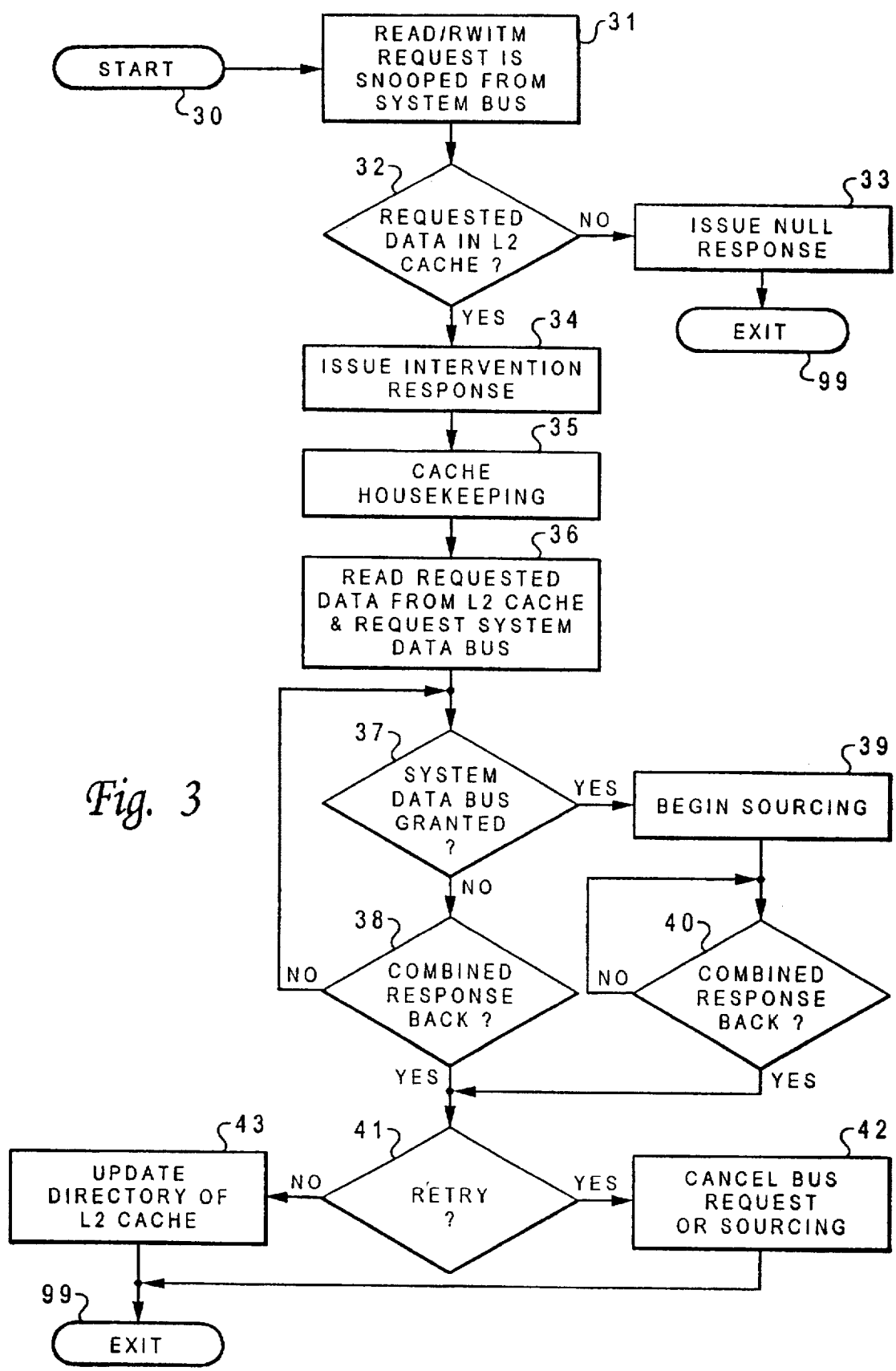
FIG. 3 is a high-level logic flow diagram of a method for speculatively sourcing data among cache memories within a multiprocessor data-processing system, in accordance with a preferred embodiment of the present invention.

Referring now to FIG. 3, there is depicted a high-level logic flow diagram of a method for speculatively sourcing data among cache memories within a multiprocessor data-processing system, in accordance with a preferred embodiment of the present invention. Starting at block 30, a read/RWITM request is snooped from a system bus by all processing units within the system, as shown in block 31. An L2 cache directory lookup is performed to determine by each processing unit as to whether or not the requested data is resident in its L2 cache, as depicted in block 32. A null coherency response will be issued by all those processing units that do not possess the requested data (such as processing unit 22 of FIG. 2), as illustrated in block 33, and the process exits at block 99. On the other hand, an intervention coherency response will be issued by a processing unit that possesses the requested data (such as processing unit 21 of FIG. 2), as shown in block 34.

After the issuance of the intervention coherency response, the intervening processing unit must perform certain cache housekeeping tasks, as depicted in block 35. These tasks include flushing and invalidating the data copy in the L1 cache of the intervening processing unit if the data copy in the L1 cache has been modified, or simply invalidating the data copy in the L1 cache of the intervening processing unit if the data copy in the L1 cache has not been modified.

Subsequently, the requested data is read from the L2 cache of the intervening processing unit, preferably, to a buffer, and a request for the system data bus is made to a system bus arbiter, as illustrated in block 36. A determination is made as to whether or not the system data bus has been granted, as shown in block 37. If the system data bus has not been granted, another determination is made as to whether or not a combined coherency response has returned yet, as depicted in block 38. If the combined coherency response has not returned, the process returns to block 37.

However, if the system bus has been granted, a sourcing of the requested data from the intervening processing may begin by driving the requested data to the system bus, as illustrated in block 39. Another determination is made as to whether or not a combined coherency response has returned at this point already, as shown in block 40. If the combined coherency response has not returned yet, the process will keep waiting for the combined coherency response to return while continuing the sourcing of the requested data to the system bus.

After the combined coherency response has returned, a determination is made as to whether or not the combined coherency response is a "retry," as depicted in block 41. If the combined coherency response is a retry, then the system bus request (from block 36) will be cancelled if the system bus has not been granted yet, or the sourcing of the requested data will be aborted immediately, as illustrated in block 42. Even if the sourcing has already been completed at this point, the results will be discarded due to the retry coherency response. Otherwise, if the combined coherency response is not a retry, the sourcing of the requested data will continue, if it has not been completed, until its completion. Finally, the status of the L2 cache in both the requesting processing unit and the intervening processing unit are updated accordingly, as shown in block 43, and the process exits at block 99.

As has been described, the present invention provides a method of providing a speculative sourcing scheme for sharing data among cache memories within a multiprocessor data-processing system. Specifically, the present disclosure describes a novel intervention implementation in which the requested data is read from the L2 cache of the intervening processing unit before the combined coherency response has returned.

The present invention has obvious performance advantages over the prior art because the delay between a read/RWITM request on the system bus and the sampling of the combined response can be several system bus clock cycles. Hence, by allowing the requested data to be read from the L2 cache of the intervening processing unit before the combined coherency response is received, the intervention latency is reduced tremendously and the overall SMP system performance is significantly improved.

While the invention has been particularly shown and described with reference to a preferred embodiment, it will be understood by those skilled in the art that various changes in form and detail may be made therein without departing from the spirit and scope of the invention.

What is claimed is:

1. A method for speculatively accessing data from a cache memory within a data-processing system having a plurality of processing units, each of said plurality of processing units including at least one cache memory, said method comprising the steps of:

request jig for data by a first processing unit within said data-processing system; and in response to an issuance of an intervention response from a second processing unit within said data-processing system indicating said second processing unit intends to source said requested data to a system bus, reading said requested data from said system bus prior to a combined response from all of said plurality of processing units returning to said second processing unit.

2. The method according to claim 1, wherein said reading step further includes a step of reading said requested data by a cache controller.

3. The method according to claim 1, wherein said reading step further includes a step of reading said requested data to a buffer.

4. The method according to claim 1, wherein said step of requesting for data includes a step of issuing a read request or a read-with-intent-to-modify request.

5. The method according to claim 1, wherein said intervention response from a second processing unit is a modified intervention response or a shared intervention response.

6. The method according to claim 1, wherein said method further includes a step of stopping said reading step if said returned combined response is a retry.

7. The method according to claim 1, wherein said method further includes a step of requesting a system data bus for sourcing of said requested data by said second processing unit before the return of said combined response.

8. The method according to claim 7, wherein said method further includes a step of sourcing said requested data by said second processing unit before the return of said combined response.

9. A processing unit having a cache memory capable of speculatively sourcing data within a multiprocessor data-processing system, said processing unit comprising:

means for requesting data by a first processing unit within said data-processing system; and responsive to issuance of an intervention response from a second processing unit within said data-processing system indicating said second processing unit intends to source said requested data to a system bus, means for reading said requested data from said system bus prior to a combined response from all said plurality of processing units returns to said second processing unit.

10. The processing unit according to claim 9, wherein said means for reading is a cache controller.

11. The processing unit according to claim 9, wherein said means for reading further includes a means for reading said requested data into a buffer.

12. The processing unit according to claim 9, wherein said request for data includes a read request or a read-with-intent-to-modify request.

13. The processing unit according to claim 9, wherein said intervention response from a second processing unit is a modified intervention response or a shared intervention response.

14. The processing unit according to claim 9, wherein said processing unit further includes a means for stopping said reading by said reading means if said returned combined response is a retry.

15. The processing unit according to claim 9, wherein said processing unit further includes a means for requesting a system data bus for sourcing of said requested data by said second processing unit before the return of said combined response.

16. The processing unit according to claim 15, wherein said processing unit further includes a means for sourcing said requested data by said second processing unit before the return of said combined response.

* * * * *

UNITED STATES PATENT AND TRADEMARK OFFICE
CERTIFICATE OF CORRECTION

PATENT NO. : 5,895,484
DATED : April 20, 1999
INVENTOR(S) : Arimilli et al.

It is certified that error appears in the above-identified patent and that said Letters Patent is hereby corrected as shown below:

In column 6, line 15, please delete "jig".

Signed and Sealed this

Twenty-third Day of November, 1999

Attest:

Q. TODD DICKINSON

*Attesting Officer*   *Acting Commissioner of Patents and Trademarks*